Jan. 10, 1956 M. P. ESPY ET AL 2,730,380
COUPLING
Filed April 26, 1952
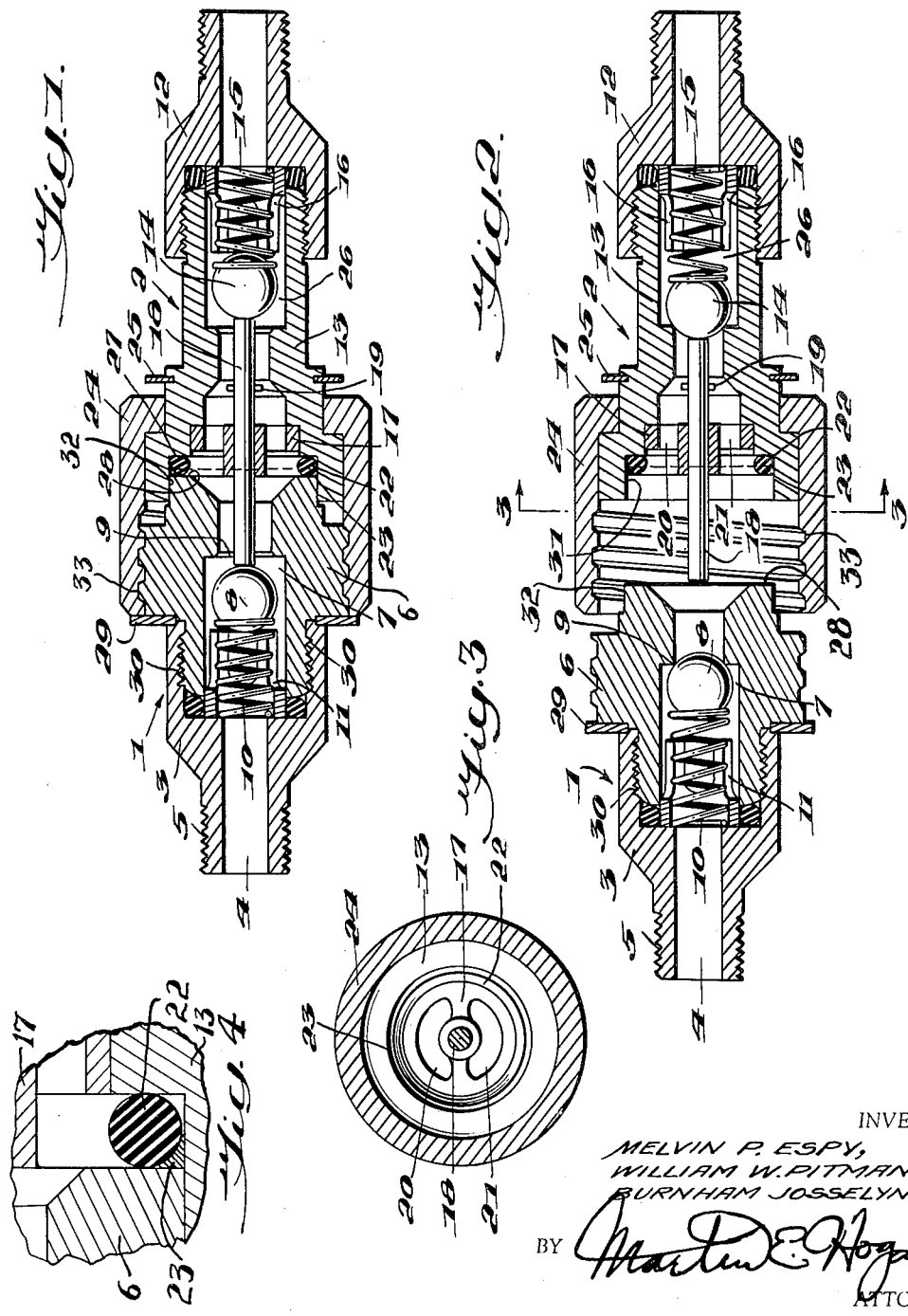
INVENTORS
MELVIN P. ESPY,
WILLIAM W. PITMAN,
BURNHAM JOSSELYN,
BY Martin E. Hogan Jr.
ATTORNEY

2,730,380

COUPLING

Melvin P. Espy, Mount Royal, Quebec, Canada, and William W. Pitman, Colgate, and Burnham Josselyn, Kingsville, Md., assignors to The Glenn L. Martin Company, Middle River, Md., a corporation of Maryland Application April 26, 1952, Serial No. 284,602

3 Claims. (Cl. 284—19)

This invention relates to couplings for high pressure hydraulic lines, and more particularly to improvements in the construction of such couplings containing valves for preventing the escape of fluid from the lines when the members of the coupling are separated.

Where hydraulic lines must be frequently coupled and uncoupled, as when used in hydraulic test equipment, it is very desirable to have a coupling which can be quickly and easily coupled and uncoupled by hand, which will withstand the high pressures incident to the testing operation without leakage or failure, and which will automatically prevent the loss of fluid from the lines while remaining uncoupled.

A major disadvantage of couplings intended to be coupled and uncoupled by hand arises from the difficulty of effectively sealing such couplings against leakage, especially during high pressure operation, since the force which can be exerted by hand is ordinarily not sufficient to provide an effective seal at the junction between the two elements of the coupling.

An additional disadvantage of couplings containing valves to prevent loss of fluid while uncoupled lies in the fact that the valve mechanism so restricts the flow of fluid through the coupling that for any substantial flow rate the pressure drop through the coupling is very high. Where the number of couplings used is relatively large, as in a hydraulic test set-up, the cumulative pressure drop through the fittings is quite troublesome.

It is the object of this invention, therefore, to provide a hydraulic coupling which may be easily and quickly uncoupled by hand and which will prevent the loss of fluid from the hydraulic lines while uncoupled.

It is another object of this invention to provide a valved hydraulic coupling which has a large flow area and a consequent low pressure drop through the fitting for relatively high fluid flow rates.

It is still another object of this invention to provide a hydraulic coupling which may be coupled and uncoupled by hand and which has a sealing arrangement effective to prevent leakage during high-pressure operation.

This and other advantages of the present invention will be apparent from the following description taken in connection with the accompanying drawing.

In the drawing:

Fig. 1 is a sectional view of the coupling contemplated by this invention showing the coupling elements connected together.

Fig. 2 is a sectional view showing the coupling elements separated and the check valves closed.

Fig. 3 is a sectional view taken along line 3—3 of Fig. 2.

Fig. 4 is an enlarged fragmentary view of the seal between adjoining elements of the coupling.

As indicated in the drawings, the coupling consists of two elements, a male portion indicated generally at 1, and a female portion indicated generally at 2. Male portion 1 consists of an end fitting 3 containing a passage 4, and which is threaded at 5 for attachment to a hydraulic line (not shown), and a valve housing 6 to which fitting 3 is attached by means of threads 30. A chamber 7 formed internally of the housing contains a ball 8 which is urged firmly against the valve seat 9, when the coupling is disconnected, by the spring 10. Stop 11 serves to guide spring 10 and acts as a stop for ball 8 to limit the extent to which the spring may be compressed.

The female portion 2 of the coupling consists of an end fitting 12 identical with fitting 3, and a valve housing 13 having a valve chamber 26 containing a ball 14, spring 15, and stop 16, which function in the same manner as the similar arrangement in the male portion 1. A valve rod guide 17 is press fitted in housing 13 as shown and serves as a guide for valve rod 18 which passes through the center of the guide and is free to slide axially therethrough. A pin 19 extending through the valve rod acts as a stop and retains the rod in the guide when the coupling elements are separated. As seen in Fig. 3, openings 20 and 21 are provided in the guide for the free passage of hydraulic fluid therethrough.

The outer end of female member 2 is provided with a recess 31 to receive the terminal portion 32 of the male member 1 in close-fitting relationship. An O ring seal 22 is snugly fitted within the recess 31 and is retained in position by annular retaining ring 23 which is press fitted into the housing, as shown in Fig. 4. Coupling nut 24 is carried by the housing 13 with freedom to rotate thereon and is retained on the female portion of the coupling, when it is disconnected, by snap ring 25.

When the two halves of the coupling are connected together as shown in Fig. 1, the rod 18 extending between the balls 8 and 14 holds the valves open against the action of springs 10 and 15 respectively so that the hydraulic fluid may flow freely through the coupling.

When the coupling elements are separated as shown in Fig. 2, the balls are forced against their respective valve seats by the springs, thus preventing the escape of fluid from the lines while the coupling remains disconnected.

To prevent leakage of the fluid from the coupling while it is operating under pressure, a unique sealing arrangement is used. It is obvious that if the sealing member 22 were subjected to a high compressive force each time the two halves of the coupling were connected together, it would soon deteriorate and its effectiveness would be destroyed. On the other hand, if an ordinary sealing ring or gasket were used, a high compressive force would be necessary to effect a satisfactory seal. In the present device, however, the O ring seal 22 is contained, when the two halves of the coupling are joined, in the recess formed between shoulder 27 of housing 13 and the face 28 of the housing 6. Washer 29 which is held in place between fitting 3 and housing 6 acts as a stop for the coupling nut 24, limiting the extent to which the two halves of the coupling may be drawn together so that O ring 22 is only slightly compressed when the coupling is connected. The pressure of the hydraulic fluid within the coupling acts against the inner periphery of the O ring forcing it tightly into the aforementioned recess and tending to give the O ring an elliptical cross section so that its sides are forced tightly against the shoulder 27 of housing 13 and the face 28 of housing 6, thus effectively sealing the coupling against leakage.

Since the sealing effect of the O ring does not depend on the two halves of the coupling being tightly drawn together, the threads 33 of the coupling nut 24 may have a very long lead so that the coupling may be rapidly and easily connected and disconnected by hand, the resulting hydraulic connection being efficient and leakproof.

When the coupling is operating at high pressures, the O ring will tend to extrude into the joint between the two halves of the coupling and will be damaged when the coupling is separated. To prevent such extrusion, the ring 23, chamfered on its inner periphery, is press fitted into housing 13 so that the chamfered surface provides a smooth bearing surface for the O ring. Thus extrusion of the O ring is prevented, the ring 23 at the same time acting as a retaining ring to hold the O ring in place when the halves of the coupling are separated.

Because of the simplicity of the construction of the coupling, a large flow area is provided and the flow path through the coupling is essentially unobstructed, so that the pressure drop through the fitting is quite low for any given flow rate.

It is to be understood that the invention herein described is not confined to the precise details of construction herein set forth, as it is apparent that many changes and variations may be made without departing from the scope of the invention, and no limitation is intended by the phraseology of the foregoing description or the illustrations in the accompanying drawings.

We claim as our invention:

1. A separable hydraulic coupling for use in conjunction with high pressure hydraulic fluid lines comprising, interfitting male and female members, fastening means for removably fastening said members in interfitting engagement, each of said members having a passage to permit the flow of fluid through said coupling when said members are fastened in interfitting engagement, the outer end of said female member providing a recess to receive the terminal portion of said male member in close-fitting relationship, said recess terminating in an inner transverse shoulder, said male member having an end face on said terminal portion, said shoulder and said end face lying in substantially parallel planes and defining a space therebetween when said members are fastened in interfitting engagement, and an O-ring seal member positioned in said recess against said shoulder and having an external diameter substantially equal to the internal diameter of said recess, said seal member normally being greater in thickness than the dimension of said space, and therefore being somewhat compressed between said shoulder and said end face when said male and female members are fastened in interfitting engagement, the fluid pressure in said coupling tending to expand the ring against the shoulder and end face whereby leakage between said male and female members is prevented.

2. A separable hydraulic coupling for use in conjunction with high pressure hydraulic fluid lines comprising, interfitting male and female members, fastening means for removably fastening said members in interfitting engagement, each of said members having a passage to permit the flow of fluid through said coupling when said members are fastened in interfitting engagement, valve means located in the passage of each of said members, the outer end of said female member providing a recess to receive the terminal portion of said male member in close-fitting relationship, said recess terminating in an inner transverse shoulder, said male member having an end face on said terminal portion, said shoulder and said end face lying in substantially parallel planes and defining a space therebetween when said members are fastened in interfitting engagement, and an O-ring seal member positioned in said recess against said shoulder and having an external diameter substantially equal to the internal diameter of said recess, said seal member normally being greater in thickness than the dimension of said space, and therefore being somewhat compressed between said shoulder and said end face when said male and female members are fastened in interfitting engagement, the fluid pressure in said coupling tending to expand the ring against the shoulder and end face whereby leakage between said male and female members is prevented.

3. A separable hydraulic coupling for use in conjunction with high pressure hydraulic fluid lines comprising, interfitting male and female members, fastening means for removably fastening said members in interfitting engagement, each of said members having a passage to permit the flow of fluid through said coupling when said members are fastened in interfitting engagement, valve means located in the passage of each of said members, the outer end of said female member providing a recess to receive the terminal portion of said male member in close-fitting relationship, said recess terminating in an inner transverse shoulder, said male member having an end face on said terminal portion, said shoulder and said end face lying in substantially parallel planes and defining a space therebetween when said members are fastened in interfitting engagement, an O-ring seal member positioned in said recess against said shoulder and having an external diameter substantially equal to the internal diameter of said recess, and a retaining ring in said recess to prevent said seal member from extruding under high pressure, and to keep said seal member from becoming displaced when said male and female members are separated, said seal member normally being greater in thickness than the dimension of said space, and therefore being somewhat compressed between said shoulder and said end face when said male and female members are fastened in interfitting engagement, the fluid pressure in said coupling tending to expand the ring against the shoulder and end face whereby leakage between said male and female members is prevented.

References Cited in the file of this patent

UNITED STATES PATENTS

| Number | Name | Date |
| --- | --- | --- |
| 1,137,551 | Taby et al. | Apr. 27, 1915 |
| 1,345,571 | Yates | July 6, 1920 |
| 1,855,264 | Thompson | Apr. 26, 1932 |
| 2,108,714 | Hirsch et al. | Feb. 15, 1938 |
| 2,307,427 | Smith et al. | Jan. 5, 1943 |
| 2,307,828 | Eggleston | Jan. 12, 1943 |
| 2,420,104 | Smith | May 6, 1947 |
| 2,475,206 | Smith | July 5, 1949 |
| 2,614,866 | Ulrich | Oct. 21, 1952 |

FOREIGN PATENTS

| Number | Country | Date |
| --- | --- | --- |
| 159,651 | Austria | Oct. 25, 1949 |
| 925,794 | France | Mar. 31, 1947 |